TELEPHONE SYSTEM WITH REGISTRATION FOR WAITING CALLS

Filed May 5, 1958

INVENTORS
NILS EMIL NILSSON
JOHAN CARL HAROLD BJÖRK
GUSTAV OSCAR RODNERT
BY Hane and Nydick
ATTORNEYS July 17, 1962 N. E. NILSSON ET AL 3,045,067

TELEPHONE SYSTEM WITH REGISTRATION FOR WAITING CALLS

Filed May 5, 1958

7 Sheets-Sheet 2

INVENTORS
NILS EMIL NILSSON
JOHAN CARL HAROLD BJÖRK
GUSTAV OSCAR RODNERT

BY Hane and Nydick
ATTORNEYS

INVENTORS
NILS EMIL NILSSON
JOHAN CARL HAROLD BJÖRK
GUSTAV OSCAR RODNERT
BY Hane and Nydick
ATTORNEYS INVENTORS
NILS EMIL NILSSON
JOHAN CARL HAROLD BJÖRK
GUSTAV OSCAR RODNERT
BY
ATTORNEYS

TELEPHONE SYSTEM WITH REGISTRATION FOR WAITING CALLS

Filed May 5, 1958

INVENTORS
NILS EMIL NILSSON
JOHAN CARL HAROLD BJÖRK
GUSTAV OSCAR RODNERT
BY Hane and Nydick
ATTORNEYS July 17, 1962 N. E. NILSSON ET AL 3,045,067

TELEPHONE SYSTEM WITH REGISTRATION FOR WAITING CALLS

Filed May 5, 1958 7 Sheets-Sheet 6

INVENTORS
NILS EMIL NILSSON
JOHAN CARL HAROLD BJÖRK
GUSTAV OSCAR RODNERT

BY Hane and Nydick
ATTORNEYS

TELEPHONE SYSTEM WITH REGISTRATION FOR WAITING CALLS

Filed May 5, 1958 7 Sheets-Sheet 7

INVENTORS
NILS EMIL NILSSON
JOHAN CARL HAROLD BJÖRK
GUSTAV OSCAR RODNER
BY Hane and Nydick
ATTORNEYS 3,045,067

TELEPHONE SYSTEM WITH REGISTRATION FOR WAITING CALLS

Nils Emil Nilsson and Johan Carl Harold Björk, Stockholm, and Gustav Oscar Rodnert, Hagersten, Sweden, assignors to Telefonaktiebolaget L M Ericsson, Stockholm, Sweden, a corporation of Sweden Filed May 5, 1958, Ser. No. 732,854
Claims priority, application Sweden May 9, 1957
5 Claims. (Cl. 179—5.5)

This invention refers to automatic telephone systems equipped with registering means for waiting calls, particularly private automatic branch exchanges, for registering the numbers of the calling and the called subscriber's lines, in the event a desired connection cannot be put through, for example because no answer is obtained or because the called number is marked busy, and for setting up, by means of steps taken by the called subscriber, the communication at a later time. In telephone instruments at offices or other establishments, a telephone checking device that answers and lists the persons that are calling, when the subscriber does not answers, is often arranged. In the event of a prolonged absence of the subscriber all calls to the telephone instrument are suitably switched by means of automatic transfer service to a machine that reproduces a prerecorded answer, for example "away, call the information." In the event of a brief absence another operation is required, and the object of the invention is to give the subscribers the possibility, after an occasional absence, of being informed without manual aid who has been calling and desires to be called back.

The invention refers to telephone systems comprising selectors and registers and a call identifier and a marker for setting up communications over selectors under control of said registers and identifiers, and provided with a first multiple with marking conductors for marking the telephone number, to which the marker has to set up a connection, said multiple being common to all the registers, and with a second common multiple with marking conductors for marking the telephone number from which the communication originates.

The object of the invention is achieved by means of a number of relay sets, each of which contains a registering device for each of said multiples, for registering by means of an introductory call that is initiated with a special directive digit and causes selection of a free relay set, by the aid of the markings on the marking conductors in said multiples, marking the number of the subscriber's line with which a communication is desired, and the number of the subscriber's line that is calling, and by a control device in each relay set which by means of circuits over said second multiple is actuated when a call from the subscriber's line, registered as called, is identified, and which thereby causes connection of a signal device to this subscriber's line for informing the subscriber regarding the completed registration.

The invention will now be described below more in detail by means of the annexed drawings, FIGS. 1–8, in which there is shown an embodiment of the invention where the above mentioned relay sets simultaneously effect the telephone checking service and the automatic transfer service.

Figure 1:
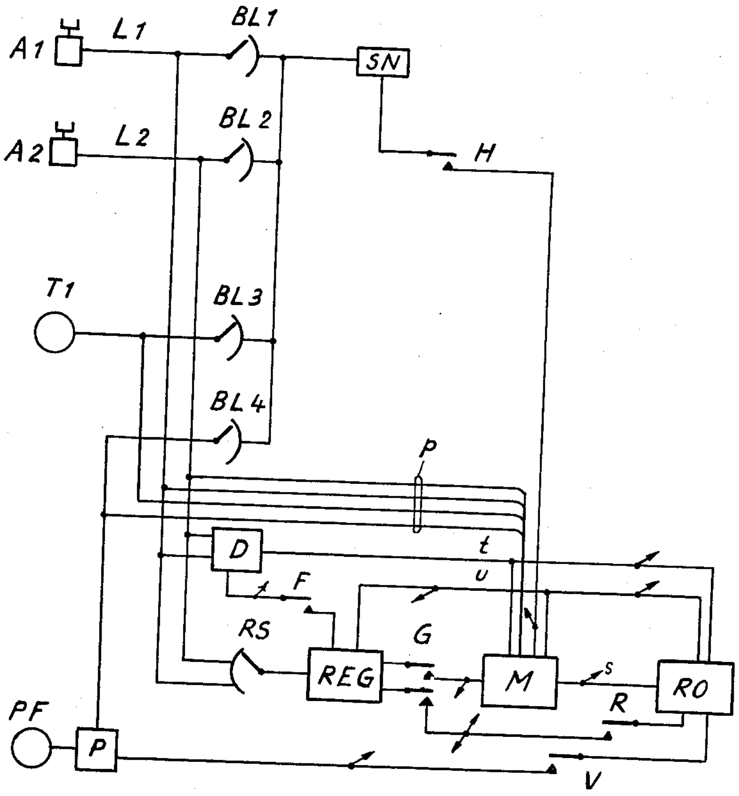
FIG. 1 shows a general diagram of an exchange.
Figure 8:
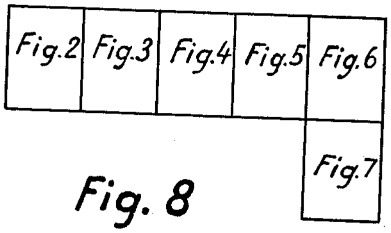
FIG. 8 shows how the FIGS. 2 to 8 should be continued.

In FIG. 1 A1 and A2 are subscriber's instruments, L1 and L2 subscriber's lines, T1 and PF are sound reproducing machines and BL1–BL4 selectors which connect the subscriber's instruments and the machines to link circuits SN so that connections are put through. There are furthermore a number of registers REG, each of which has a register finder RS, a marker M and connecting relays G for the registers and R for a number of relay sets RO. Two multiples *t* and *u* are connected to the marker. The multiple *t* extends from the identifier D and is used to determine and supervise the number of a calling subscriber's line. The multiple *u* extends from the registers and is used to transmit the number of a called subscriber's line to the marker and to the relay sets RO and to effect switch control of the calls within the exchange. A group of wires *p* indicates the lines which are to be connected to each other. By means of a relay means F a free register is selected and by means of relays H the marker selects a free link circuit.

At a call from the instrument A1 the line L1 is connected through a finder RS to a register REG. The subscriber at the instrument A1 hears a dialling tone from the register and dials the number of for example the instrument A2 on his dial, whereby the number is registered in the register REG and the dialling tone ceases. If the marker M is free, the register REG is connected by means of a relay G to the marker M and marks the called number in the multiple *u*. Simultaneously the register actuates the identifier D, which indicates the number of the calling line in the multiple *t*. The marker selects a free link circuit SN by operation of a relay H and sets the selectors BL1 and BL2 through circuits through the wires *p*. A connection is obtained between the instruments A1 and A2 through the lines L1 and L2, the selectors BL1 and BL2 and the link circuit SN.

If a person at the instrument A2 wishes calls for him to be switched to the instrument A1, he himself can initiate such switching. This is effected by means of the instrument A1 by first dialling a directive number 09 and thereafter the number of the instrument A2. When the directive number 09 is received in register REG, it is registered on a relay in the register, whereafter the register is restored to normal without being disconnected. The subscriber hears a dialling tone again and dials the number of instrument A2 which is registered in the register. The register is thereafter connected through a relay G to the marker M and a relay R selects and actuates a free relay set RO. Simultaneously, the register actuates the identifier D. The marker M is prevented from setting up a connection. Instead, the number of the calling instrument A1 is transmitted by means of the multiple *t* to the selected relay set RO, and the number of instrument A2 registered in the register is transmitted by means of multiple *u* to the selected relay set RO, which after having registered the numbers, sends a signal to the register REG for disconnection of the marker. The calling subscriber again hears a dialling tone and may now put down his handset. Thereafter the relay set RO controls all the numbers which are called, and switches the marker by means of signal wires *s*, so that all the calls to the instrument A2 are automatically switched to the instrument A1.

If the subscriber at A1 dials the directive number 02 instead of 09, no further dialling is thereafter required, but the number 02 is transmitted together with the number of instrument A1 to a free relay set RO. This set thereafter switches all the calls to the instrument A1 to an electric sound reproducing machine T1, which sends a prerecorded message, for example "away, call the information."

There is a special directive number 01 for disconnecting the relay set RO. A subscriber who wants to cancel an order of transfer, dials the directive number 01, whereby the register REG registers 01 by actuating a relay, restores its registering mechanism to normal and again sends a dialling tone. The subscriber thereafter dials his own number, and the relay set, which has registered said number, is actuated and is released. The subscriber hears for the third time dialling tone from the register and has now to put down his handset.

If the subscriber at the instrument A1 calls the instrument A2 without receiving an answer, or if he finds A2 busy for a long time, he can dial the directive number 00 and then the number of the instrument A2. The register REG now connects itself to the marker M, a free relay set RO is selected, the number of the instrument A1 is identified and the number of the instrument A1 as well as of the instrument A2 are registered in the relay set RO. The marker is disconnected and the register is restored to normal. A dialling tone is again switched on and the subscriber has to put down his handset. Then calls from the instrument A2 are so controlled that the calls are answered with a special tone or by a sound reproducing machine instead of the usual dialling tone from the register.

When the subscriber at the instrument A2 hears this answering signal, he has for example to call the directive digit 01 and dial his own telephone number in order to release the relay sets RO which have been set for telephone checking, and receive message from the sound reproducing machine PF as to the telephone numbers that he has to call up. If the subscriber at A2 himself has switched his instrument for transfer service, said special answering signal will likewise be obtained from the register as a reminder thereof. In such event also he has to dial the directive digit 01 and dial his own number in order to release the relay set and cancel the transfer setting. If he wishes to maintain the order of transfer or wants to postpone listening to the telephone checking device, connections will be set up as at a usual dialling tone from the register.

FIGS. 2–7 are more detailed circuit diagrams of an automatic exchange. The exchange comprises cross-bar switches and electromagnetic relays. Each subscriber's instrument A1—A2 and sound reproducing machine T1, PF has an operating bar in the cross-bar switch. Each operating bar has a number (10–30) of contact spring sets for connecting links SN to a corresponding number. Several of the cross-bar switches are connected to the same links so that each link has a contact spring set in each operating bar for cross-bar switches.

Figure 3:
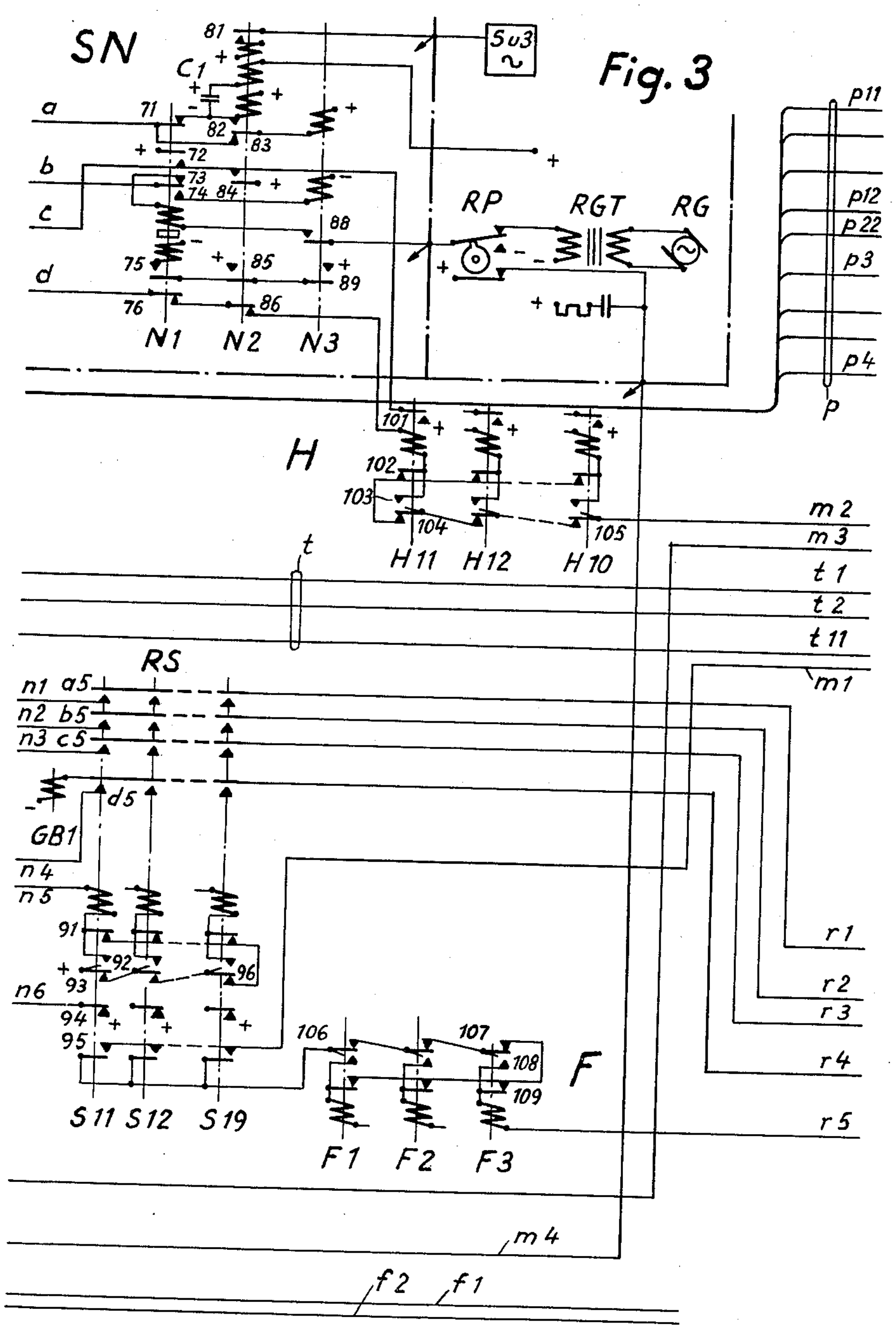
FIG. 3 shows a link circuit and a register finder and the connecting relays for these.

In order to simplify the description, FIGURE 3 only refers to a quite small exchange with 9 links corresponding to the selecting magnets S1—S9. Selecting magnets in a number of cross-bar switches are connected in parallel so that a link SN in FIGURE 4, which is indicated by a circuit including wire *d*, is selected for all the subscriber's lines and sound reproducing machines simultaneously.

Figure 2:
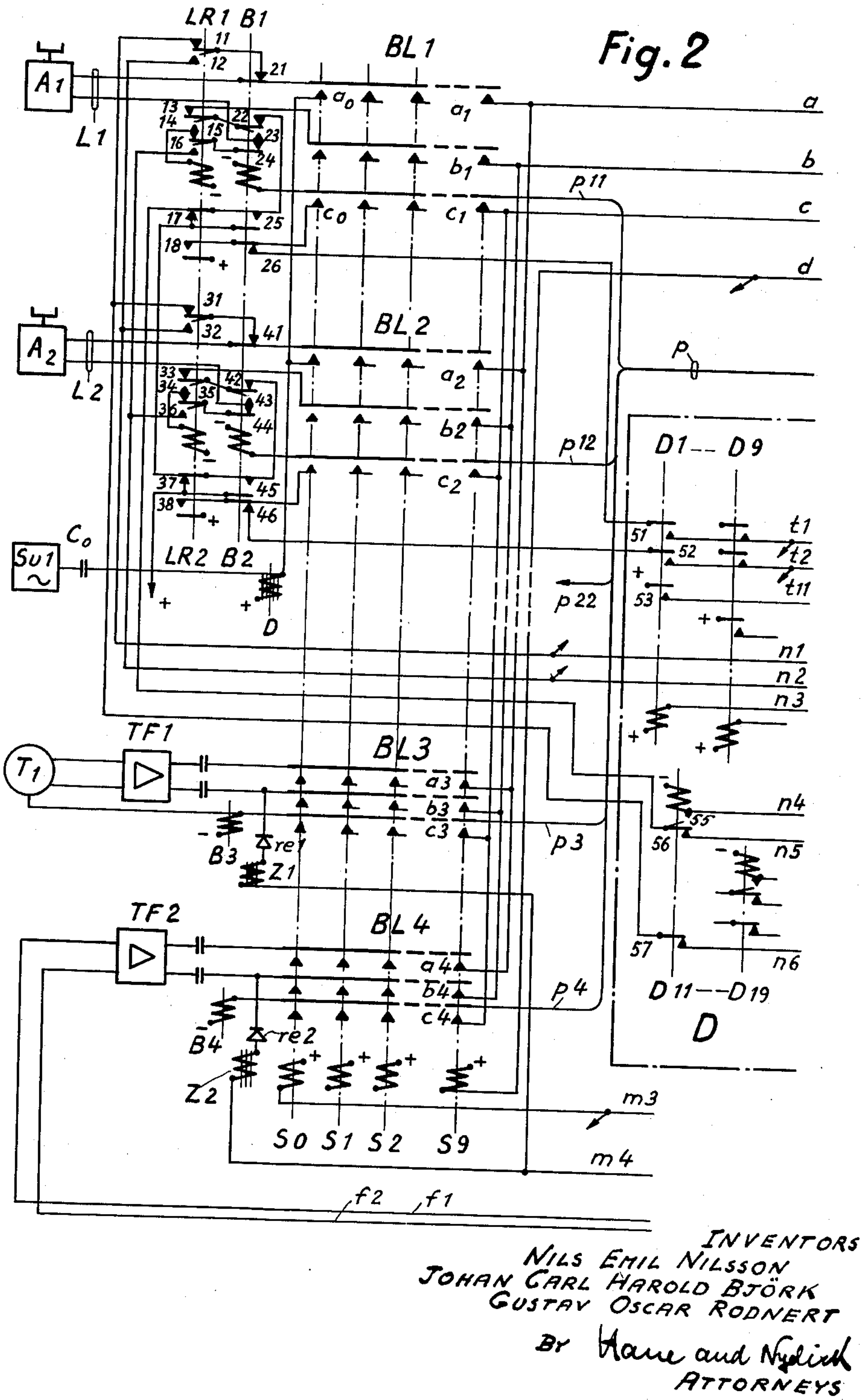
FIG. 2 shows a subscriber's lines and selectors as well as the identifier.

The register finders RS in FIGURE 3 are operating bars in a special cross-bar switch with selecting magnets S11–S19. The links SN in FIGURE 3, the registers REG in FIGURE 4 and the relay sets RO in FIGURE 6 as well as the marker M and the identifier D comprise relays. The subscriber's lines L1—L2 in FIGURE 2 are each provided with a line relay LR1—LR2 and are grouped by tens. The operating magnets B1—B2 serve as break relays. The line relays LR1—LR2 are used for connecting the subscriber's lines to register-connecting-wires N1—N2 common to each tens group, which simplifies the connection to the register and the identification.

This is achieved by arranging the line relays within each tens in a chain so that only one line relay at a time within the tens can attract its armature. The subscriber's numbers are two-digit numbers and the holding time for the registers is short so that there is no undue waiting time owing to only one subscriber at a time being able to set up a connection within each tens. The register finders RS in FIGURE 3 each have one position for each tens subscriber which means that the selecting magnets S11–S19 each pertain to a tens group.

If a call is put through from the instrument A1, which is assumed to have the number 11, to the instrument A2, which is assumed to have the number 12, the following connections are made. When the subscriber at the instrument A1 lifts his handset, the line relay LR1 attracts in the following circuit: +, contact 94 in FIGURE 3, wire *n6*, contacts 57, 11 and 21, loop through line L1 and instrument A1, contacts 24 and 15, winding on relay LR1 to negative. The contacts 11—18 are actuated. The contact 17 breaks the operation circuit for relay LR2 and the other line relays pertaining to the same tens as LR1. Relay LR1 breaks the contact 15 and is kept energized through contact 14 in the following circuit: +, the contacts 93—96 and 91 in FIGURE 3, winding on selecting magnet S11, wire *n5*, contacts 56, 22 and 14, winding on relay LR1, to negative. The selecting magnet S11 attracts. The contacts 91—95 are actuated.

Figure 4:
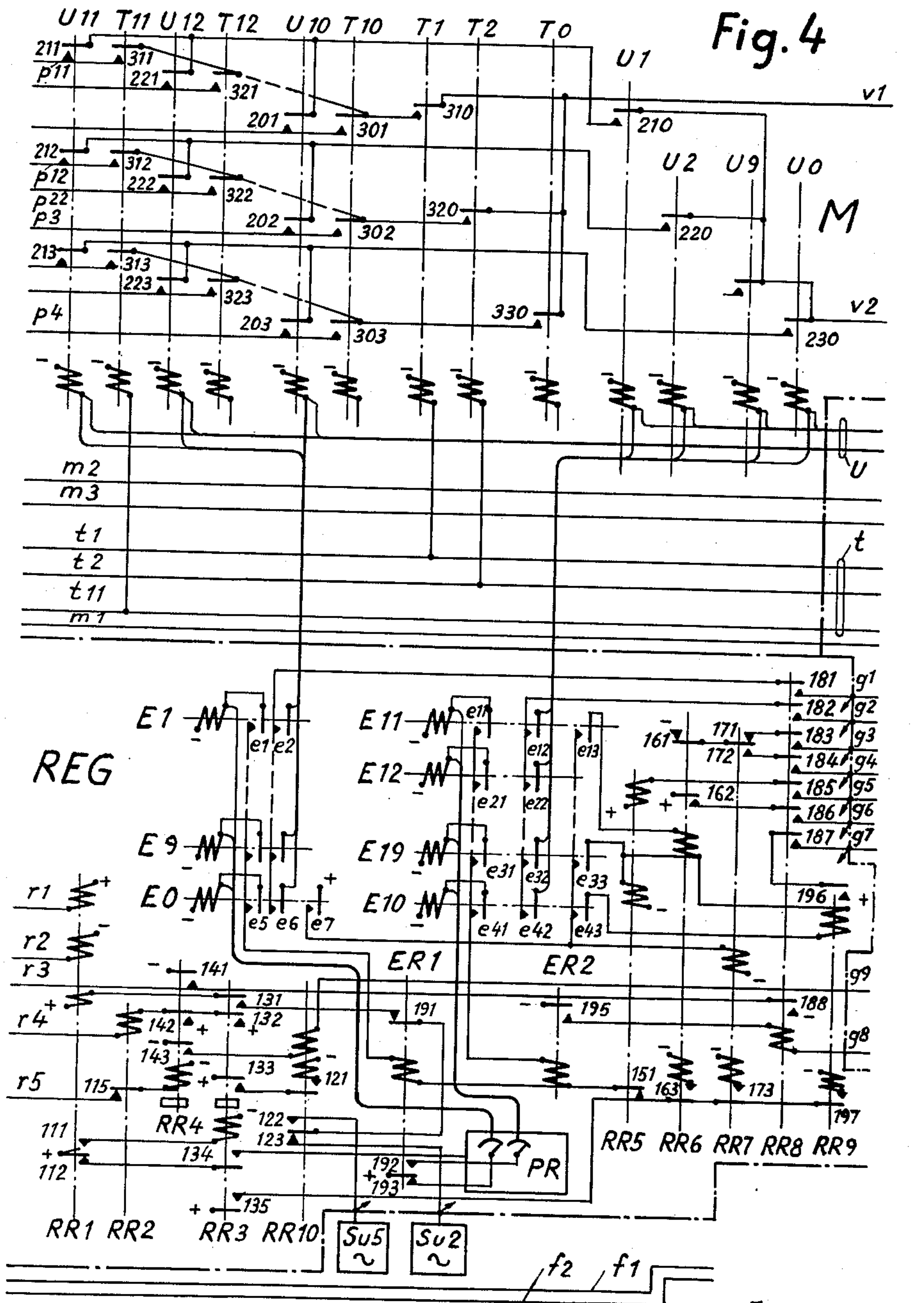
FIG. 4 shows a register and relays, which pertain to the marker and which are connected to the marking conductors in the common multiples.
Figure 5:
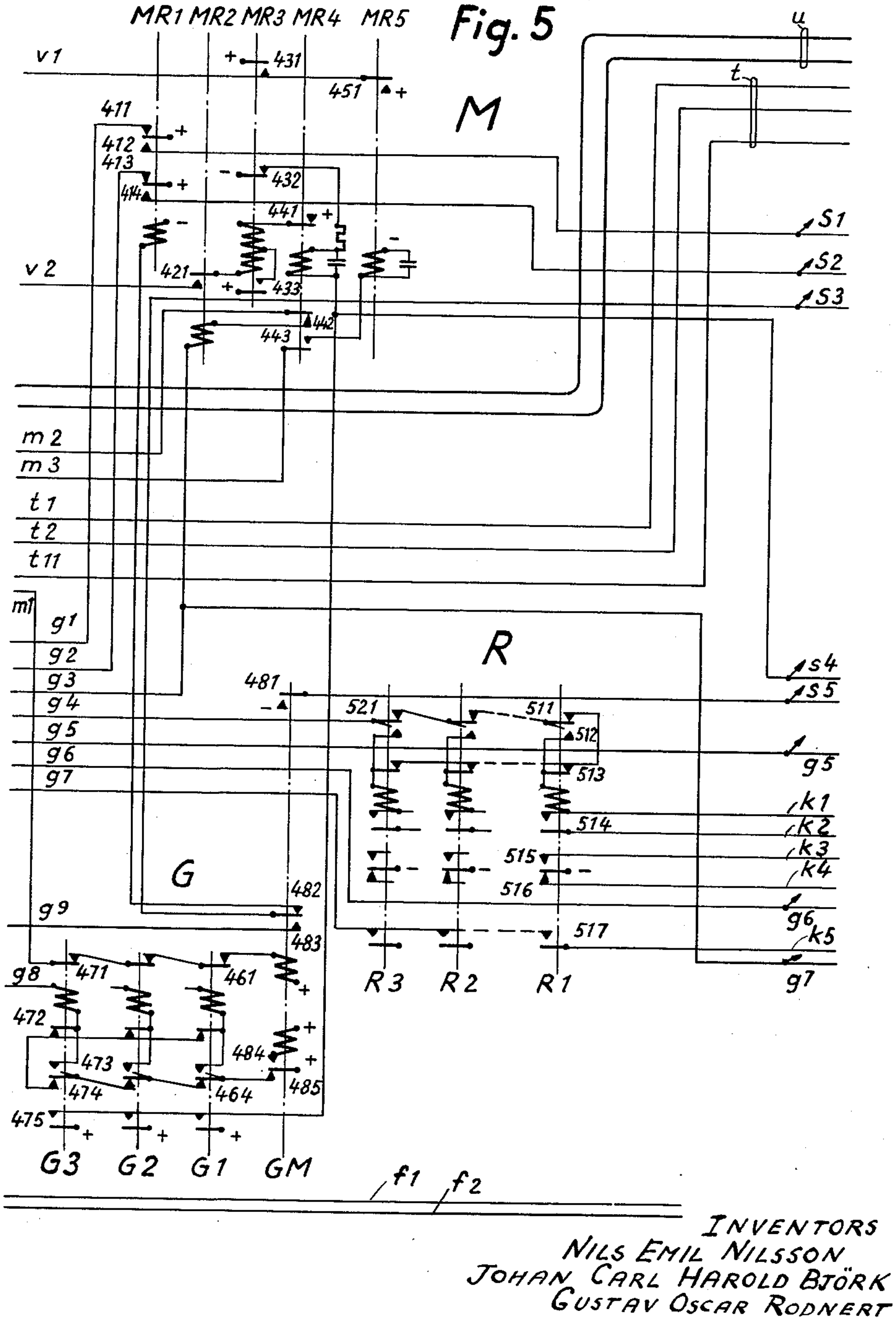
FIG. 5 shows relays in the marker.

The contact 95 closes a circuit for selecting a free register: +, the upper winding on relay GM in FIGURE 5, contacts 461—471, wire *m1*, contacts 95, 106—107 and 109, winding on relay E3, wire *r5*, contact 115 in FIGURE 4, winding on relay RR4, to negative. The relays GM, F3 and RR4 attract and the contacts 431—485, 107—109 and 141—143 are actuated. The relay GM is slow releasing owing to the contact 484 which short-circuits the lower winding of the relay. The selecting magnets S11–S19 form a relay chain and the relays F1–F3 another relay chain, in which only one selecting magnet and one relay at a time can attract. The contact 94 breaks the operation circuit for all the line relays LR1—LR2 in the tens group. The following circuit is closed for the selected register REG: +, contact 142, winding on relay RR2, wire *r4*, winding on the operating magnet GB1, to negative. The operating magnet GB1 actuates the contacts *a5*—*d5*. The relays RR2 and D11 are energized though the wire *n4*, contact *d5* and wire *r4* and attract their armatures. The contacts 55—57 and 115 are actuated. The selecting magnet S11 and the relay F3 release their armatures. The relay RR4 is slow releasing and during its release time the relays RR1 and RR3 operate in the following circuits: +, the upper winding on relay RR1, wire *r1*, contact *a5*, wire *n1*, contacts 12 and 21, line L1 and the instrument A1, the contacts 24 and 16, wire *n2*, contact *b5*, wire *r2*, the intermediate winding on relay RR1, to negative. The contacts 111—112 are actuated. The relay RR3 is energized through the contact 11. The contacts 131—135 are actuated. The line L1 is thereby connected to the register REG and the calling subscriber receives a dialling tone which is transmitted from the buzzer generator Su2 through the contacts 123, 191 and 131 and the lower winding on the relay RR1.

The calling subscriber dials the number of the instrument A2, whereby the impulse series are repeated by the impulse relay RR1 and transmitted by the contacts 112 and 133 to a relay set PR, which in a known manner counts the impulses, registers the impulse series on the registering means E1–E0 or E11–E10 and is thereafter restored to initial position after each impulse series. The first digit, which is 1, is registered by actuation of relay E1.

The contacts *e1* and *e2* close. Relay ER1 attracts when the relay set PR is restored after the first impulse series in the following circuit: +, the contacts 135 and 151, winding on relay ER1, contact *e1*, winding on relay E1, to negative. The contacts 191—193 are actuated. Contact 191 disconnects the dialling tone and the contacts 192—193 switch over between the registering means E1–E0 and E11–E10.

The second impulse series, the digit 2, is registered by operation of the relay E12. The contacts *e*21—*e*22 close. Relay ER2 attracts when the relay set PR is restored for the second time, through the following circuit: +, the contacts 135 and 151, winding on relay ER2, contact *e*11, winding on relay E11, to negative. The contact 195 is actuated.

If the marker M is free, the following circuit is closed: +, the contacts 485, 464—474 and 472 in FIGURE 5, winding on relay G3, wire *g*8, winding on relay RR8, contact 195, to negative. The relays G3 and RR8 attract. The contacts 471—475 and 181—188 are actuated. The following circuit is closed for identifying the calling subscriber's line L1: +, winding on relay D1 in FIGURE 2, wire *n*3, contact *c*5, wire *r*3, contact 188, to negative. Relay D1, which pertains to the tens group of subscribers from which the call is coming, attracts and closes on one hand a contact 53 for indicating the tens in the multiple *t*, on the other hand 10 contacts 51—52. The unit digit of the calling line L1 is indicated by means of the following circuit: +, contacts 18, 26 and 51, wire *t*1, winding on relay T1 in FIGURE 4, to negative. Simultaneously with relay T1, relay T11 attracts receiving current through wire *t*11 and contact 53. The contacts 311—313 and 310 close.

The following circuits are closed for indicating the calling subscriber: +, contacts 411 and 413 in FIGURE 5, wires *g*1 and *g*2, respectively, contacts 181 and *e*2, and 182 and *e*12, respectively, winding on relay U11 and U2, respectively, to negative. The relays U11 and U2 attract. The contacts 211—213 and 220 close.

The following circuit is closed for selecting a free link SN: +, winding on selecting magnet S9, wire *d*, contacts 76 and 86, winding on relay H11, contacts 102, 104—105, wire *m*2, contact 442, winding on relay MR2, wire *g*3, contacts 183, 171 and 161, to negative. The relays MR2 and H11 and the selecting magnet S9 attract. The contacts 421 and 101—104 are actuated. The selected link SN is indicated in all the operating bars for cross-bar switches BL1–BL4.

The contact 475 on relay G3 in FIGURE 5 has closed a circuit for relay MR4 which is slow operating due to a condenser connected in parallel with the winding and a series resistance. During the make time for relay MR4 the condition of the called line is tested through the following circuit: +, contact 441, the upper and lower winding on relay MR3, of which the upper one has a high resistance, contact 421, wire *v*2, contacts 220 and 222, wire *p*12, winding on operating magnet B2 in FIGURE 2, to negative. If the line L2 is free, relay MR3 attracts. The contacts 431—433 are actuated. The upper winding on relay MR3 is short-circuited by contact 433, whereupon the operating magnet B2 attracts its armature. The contacts 41—46 and *a*2, *b*2, *c*2 are actuated. The contact 432 breaks the current for relay MR4 and the contact 431 closes a circuit through wire *v*1, contacts 310 and 311, wire *p*11, winding on operating magnet B1, to negative, for connecting the calling subscriber to the selected link SN. The operating magnet B1 attracts its armature. The contacts 21—26 and *a*1, *b*1, *c*1 are actuated. The following circuit is completed: +, the lower winding on relay N2 in FIGURE 3 and the contact 71 connected in parallel with the upper winding on relay N3 through contact 83, wire *a*, contact *a*1, line L1 and instrument A1, contacts 23 and 15, winding on relay LR1, to negative. The relays N2 and N3 attract and LR1 is kept energized in this circuit. The contacts 81—86 and 88—89 are actuated. Through contact 101 and later on contact 84, + is connected to the wire *c* and the contacts *c*1 and *c*2 for holding the operating magnets B1 and B2 and for busy marking. Call signals are sent to the instrument A2 from the ringing generator RG through the transformer RGT and the upper contact spring set in the interrupter RP, contact 88, the upper winding on relay N1, contact 73, wire *b*, contacts *b*2, 33 and 43, line L2, instrument A2, contact *a*2, wire *a*, contact 71, electrolytic condenser C1, the intermediate winding on relay N2, to positive. The contact 13 on the line relay LR1 in FIGURE 2 is actuated, thus preventing ringing current from passing the line L1. Instead, an intermittent buzzer signal is sent to the instrument A1 from a buzzer generator *Su*3 through contact 81, is transformed between the upper winding and the intermediate winding on relay N and passes over wire *a* to the line L1. When the operating magnet B1 was attracted and opened the contacts 21 and 24, current for the relay RR1 in FIGURE 4 was interrupted as a result, relay releases its armature. The contact 111 is opened. When relay RR3 releases its armature, the contacts 131—135 open and the register is restored to its initial position. The contact 195 is opened and relays RR8 and G3 release. The marker M is released. The relays MR2 and H11, the selecting magnet S9 and the relays MR3, U11, T11, T1 and U2 release their armatures.

The set-up communication from the instrument A1 is maintained by means of the relays LR1 and N2. When the subscriber at the instrument A2 answers, the following circuit is closed: +, the lower winding on relay N2 connected in parallel with the upper winding on relay N3 through contact 82, contact 71, wire *a*, contact *a*2, line L2, instrument A2, contacts 43, 33 and *b*2, wire *b*, contact 73, the upper winding on relay N1, contact 88, to negative through the upper contact spring set in the interrupter RP directly or in series with the left winding on transformer RGT, depending on the position of the interrupter. Relay N1 is slow-actuating and is not operated by ringing current, but attracts its armature in said direct current circuit. The contacts 71—76 are actuated. The contact 71 breaks the current for the line relay LR1 which releases its armature, as does relay N3. Contact 73 breaks the ringing current. Relay N2 releases slowly owing to an electrolytic condenser C1 and the relay N1 is held energized through contact 85 by its lower winding. When relay N2 releases its armature, relay N1 is held owing to its slowness until relay N3 has attracted again in the following circuit: +, the upper winding on relay N3, contact 83, wire *a*, contacts *a*1 and *a*2, respectively, line L1 and instrument A1 and line L2 and instrument A2, respectively, the contacts 23, 13 and *b*1, and 43, 33 and *b*2, respectively, wire *b*, contact 74, the lower winding on relay N3, to negative. The contacts 88—89 close again, whereafter relay N1 is kept energized over contact 89 and the communication is held until both subscribers have put down their handsets.

If the called instrument A1 had been busy, the testing relay MR3 would not have attracted, but relay MR4 instead had attracted its armature and the contacts 441—443 had been actuated. The following circuit is then closed: +, winding on selecting magnet 80 in FIGURE 2, wire *m*3, contact 443, winding on relay MR5, to negative. The selecting magnet S9 releases and the selecting magnet S0 attracts quickly, whereas relay MR5 is slow-operating owing to a condenser which is connected in parallel with the winding on relay MR5. The contact 451 closes the circuit for the operating magnet B1 in FIGURE 2, which attracts. The contacts 21—26 and *a*0, *c*0 are actuated. The following circuit is closed for holding the line relay LR1: +, a choke coil D, contact *a*0, line L1, instrument A1, the contacts 23 and 14, winding on relay LR1 to negative. The operating magnet B1 is kept energized through the contacts 18 and *c*0. The calling subscriber hears busy tone, which is emitted from a buzzer generator *Su*1 through the condenser C0. The register and the marker are released as described above. If the subscriber at the instrument A2 pays a visit to the subscriber with the instrument A1 and wishes a call to the instrument A2 to be connected to the instrument A1, he dials the directive digit 09 from the instrument A1. The call is connected to a register REG as described above and the directive digit 09 is taken. The relays E0 and ER1 in FIGURE 4 attract after the first digit is taken. The contacts $e5$—$e7$ and 191—193 are actuated. Relay RR7 attracts receiving current through its upper winding and is thereafter kept energized through the contacts 135 and 173 and its lower winding. The contacts 171—173 are actuated. After the second digit has been taken as well, the relays E19 and ER2 attract. The contacts $e31$—$e33$ close. The relay RR5 is energized through its lower winding and attracts its armature. The contact 151 is actuated and the current through the relays ER1, E0 and ER2, E19 is broken which the register is able to record two new digits. The registering 09 is marked by relay RR7 which is kept energized through its lower winding and the contacts 135 and 173. The calling subscriber again hears a dialling tone when relay ER1 releases its armature and contact 191 is closed.

The subscriber now dials the number of the instrument A2, which is registered by operation of the relays E1, ER1, E12 and ER2. The relays RR8 and G3 attract as described above. The contacts 181—188 and 471—475 are actuated. The following circuit is closed: +, winding on relay R02 in FIGURE 6 in a free relay set R0, contact 614, wire $k1$, winding on relay R1, contacts 513, 511—521, wire $g4$, contacts 184, 172 and 161, to negative. The relays R1–R3 form a relay chain in which only one relay at a time can be operated. The relays R1 and RO2 attract. The contacts 511—517 and 621—624 are actuated. The relay RO4 attracts with current through contact 633, wire $k3$ and contact 515. The contacts 641—548 close. At the same time the calling subscriber's instrument A1 is marked in the multiple $t$ by means of the identifier, the relay D1 of which in FIGURE 2 is energized through contact 188 as described above, and the calling instrument A2 is marked in the multiple $u$ through the circuits to the relays $u11$ and $u2$ through the contacts $e2$, 181, 411 and $e12$, 182, 413.

Figure 6:
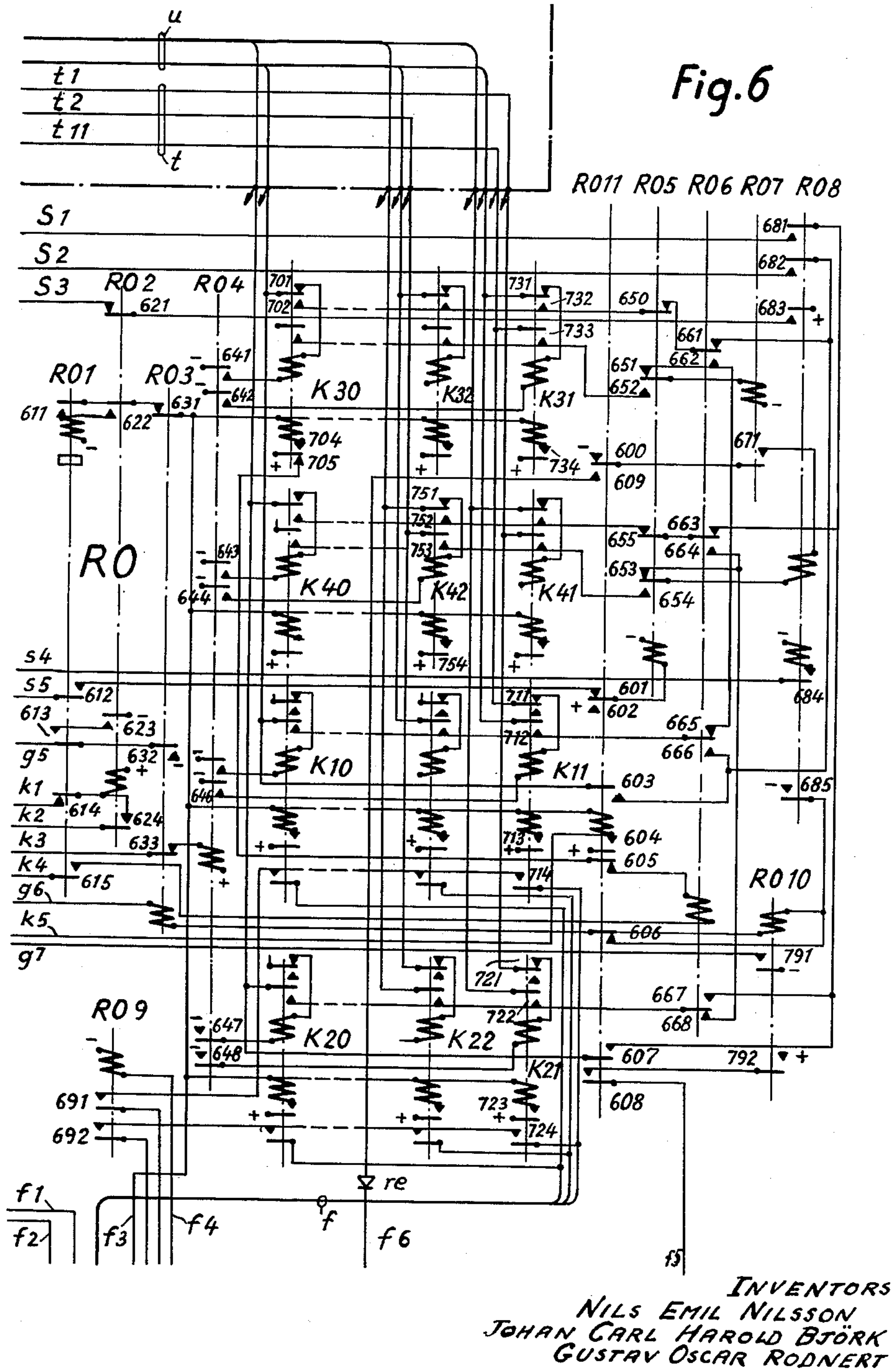
FIG. 6 shows a relay set.
Figure 7:
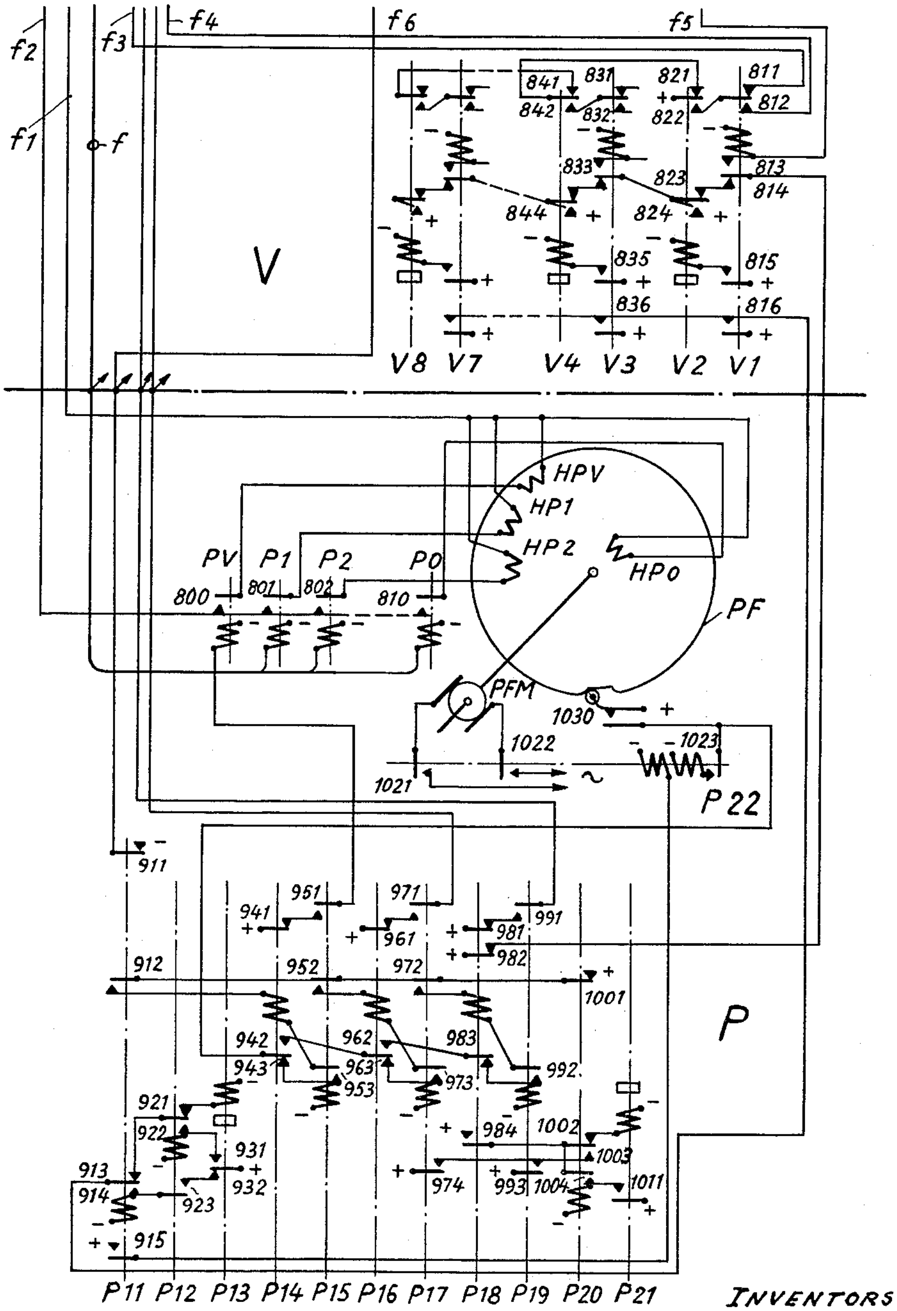
FIG. 7 shows a sound reproducing machine and means for connecting the machine to relay sets according to FIG. 6.

Owing to the marking in the multiple $t$ the relays K11 and K21 in FIGURE 6 attract in the following circuits:

($a$) +, contact 53 in FIGURE 2, wire $t11$, contact 711 in FIGURE 6, the upper winding on relay K11, contact 646, to negative.

($b$) +, the contacts 18, 26 and 51 in FIGURE 2, wire $t1$, contact 721, the upper winding on relay K21, contact 648, to negative.

The contacts 711—714 and 721—724 are actuated. The relays K11 and K21 are thereafter kept energized through their lower windings, the contacts 713, and 723, 631 and 622, respectively, and the winding on relay RO1, which latter relay is slow-operating and does not yet attract its armature.

Owing to the marking in the multiple $u$ the relays K31 and K42 attract in the following circuits:

($a$) +, contact 411, in FIGURE 5, wire $g1$, contacts 181 and $e2$, multiple $u$, contact 731, the upper winding on relay K31, contact 642, to negative.

($b$) +, contact 413, wire $g2$, the contacts 182 and $e12$, multiple $u$, contact 751, the upper winding on relay K42, contact 644, to negative.

The contacts 731—734 and 751—754 are actuated. The relays K31 and K42 are thereafter kept energized through their lower windings, the contacts 744, and 754, 631 and 622, respectively, and the winding on relay RO1 which now attracts its armature. The contacts 611—615 are actuated. The following circuit is closed: +, the upper winding on relay RR5 in FIGURE 4, contact 185, wire $g5$, the contacts 613 and 623, to negative. Relay RR5 attracts. Contact 151 is actuated and the register is restored to normal for the second time. The relays E1, ER1, E12 and ER2 as well as RR8, G3, R1 and RO2 release.

The calling subscriber again hears a dialling tone and should now put down his handset. In the relay set RO the following circuit is closed: +, the contacts 705 and 605, winding on relay RO6, contact 615, wire $k4$, contact 516, to negative. Relay RO6 attracts its armature. The contacts 661—668 are actuated and switch the windings of the control relays RO7 and RO8 from the number marked in the multiple $u$ to the number marked in the multiple $t$ since in this case the calls to the number marked in the multiple $u$ are to be switched, whereas in other cases, described below in connection with the directive digit 01 the number received through the multiple $t$ is to be supervised.

The relay RO7 connects the relay RO8 by means of the contact 671 and thus the relay RO8 can attract only if both digits in a called number correspond to the number registered in the relay set for the multiple $u$, in this case the number 12 for the instrument A2.

If hereafter a subscriber with for example the number 22 initiates a call to the instrument A2 in accordance with what has been described above in connection with the instrument A1, the number 12 is registered in the register REG, whereafter the register is connected to the marker M. The relays U11 and U2 are energized through the contacts $e2$ and $e12$, respectively, in the register REG. The following circuits are simultaneously closed:

($a$) +, contact 411 in FIGURE 5, wire $g1$, the contacts 181 and $e2$, multiple $u$, the contacts 732, 650, 662 and 651 in FIGURE 6, winding on relay RO7, to negative. Relay RO7 attracts. Contact 671 is closed.

($b$) +, contact 413, wire $g2$, the contacts 182 and $e12$, multiple $u$, the contacts 752, 655, 664 and 653, the upper winding on relay RO8, the contacts 671 and 600, to negative.

The relay RO8 attracts its armature. The contacts 681—685 close. The following circuit is closed: +, the contacts 683 and 621, wire $s3$, contact 482, winding on relay MR1, to negative. The contacts 411—414 are actuated. The marking circuits are switched from the wires $g1$ and $g2$ which pass the register, to the wires $s1$ and $s2$ which lead to the relay set RO. The relay RO8 is kept energized through its lower winding, contact 684, wire $s4$ and contact 475.

The following circuits are closed:

($a$) +, contact 412, wire $s1$, the contacts 681, 667 and 722, multiple $u$, winding on relay U1, to negative.

The relays U11 and U1 attract. The contacts 211—213 and 210 close. A free link SN is selected and its selecting magnet, for example S9, attracts, as described above. Relay MR2 attracts. The testing relay MR3 is connected through the contacts 421, 210 and 211 to the wire $p11$ pertaining to the instrument A1. At the same time the calling subscriber's line is identified by the identifier D, the relays T12 and T2 attracting at call from number 22.

If the instrument A1 is free, the testing relay MR3 attracts. The contacts 431—433 are actuated. The operating magnet B1 and the operating magnet corresponding to wire $p22$ which latter magnet is not shown on FIGURE 2 owing to lack of space, attract, and the calling line and the line L1 are connected to the link SN. The calling signal is transmitted from the instrument A1. The calling subscriber has thus automatically been connected to the instrument A1, when he dialled the number of instrument A2.

When the subscriber leaves the location of instrument A2, he can cancel the switching by dialling the directive digit 01 and thereafter his own number. The cancellation can be effected from any instrument in the exchange. When the directive digit 01 is registered in a register REG, the relays E0, ER1, RR7 and E11, ER2 attract. The relays RR5 and RR6 attract in the following circuit: +, the contacts $e7$ and $e13$, the upper winding on relay RR6, the lower winding on relay RR5, to negative. The contacts 161—163 and 151 are actuated. The registering relays E0, ER1, E11 and ER2 release, whereas the relays RR6 and RR7 are kept energized through their lower windings and the contacts 163 and 173, respectively. The subscriber again hears the dialling tone when the contact 191 is closed. The subscriber thereafter dials his own number, in this case 12, which number is registered in the register REG by operation of the relays E1, ER1, E12, ER2. The relays RR8 and G3 have now time to attract. The contacts 181—188 and 471—475 are actuated. The above mentioned circuits for operation of the relays RO7 and RO8 in relay set RO, which is set for number 12, are closed. Relay RO8 in FIGURE 6 attracts. The contacts 681—685 are closed. The following circuit is closed: +, the contacts 162 and 186, wire *g6*, winding on relay RO3, the contacts 686 and 685, to negative. Relay RO3 attracts. The contacts 631—633 are actuated. The relays K11, K21, K31 and K42 release. The following circuit is closed: +, winding on relay RR5, contact 185, wire *g5*, contact 632, to negative. Relay RR5 attracts, contact 151 is operated, the relays E1, ER1, E12, ER2, RR8 and G3 release. The subscriber again hears a dialling tone and should now put down his handset. In the relay set RO the relays RO3 and RO8 and, last RO1 which is slow-releasing, release, whereafter the relay set RO is free.

Further switching possibilities may be obtained with the invention by means of electric sound reproducing machines. A machine T1 in FIGURE 2 which when started reproduces a prerecorded message, for example "away, call the information," has been allotted a directive number 02. Supposing that the subscriber at the instrument A1 with the telephone 11 is absent for some time and wishes said message to be given in answer to a call to his instrument, he dials the directive digit 02 from his instrument A1. The digits 02 are registered in the register REG, FIGURE 4, by operation of the relays E0, ER1, E11, ER2 and RR7. The contacts *e5*—*e7*, *e21*—*e22*, 171—173 and 191—193 and 195 are actuated. The relays RR8, G3 and, for example, R1 are operated, as described above, whereby a free relay set RO has been selected. The relays RO2 and RO4 in the relay set according to FIGURE 6 attract.

The calling instrument A1 is identified by operation of relay D11 in FIGURE 2 as described above and is indicated in the multiple *t* by means of the wires *t1* and *t11*. The relays K11 and K21 in FIGURE 6 attract. The contacts 711—714 and 721—724 are actuated. Simultaneously, the number 02 is marked in the multiple *u* through the following circuits:

(*a*) +, contact 411, wire *g1*, contacts 181 and *e6*, multiple *u*, contact 701, winding on relay K30, contact 641, to negative.

(*b*) +, contact 413, wire *g2*, the contacts 182 and *e22*, multiple *u*, contact 751, winding on relay K42, contact 644, to negative. The relays K30 and K42 in FIGURE 6 attract. The contacts 701—705 and 751—754 are actuated. Relay RO1 attracts in the holding circuits through the contacts 622, 631 and 713, 723, 704, and 754, respectively. Relay RR5 in FIGURE 4 is energized through the contacts 185, 613 and 623 and restores the register REG to normal by operating contact 151 so that the relays E0, ER1, E12, ER2, RR8, G3 and R1 release. The subscriber again hears a dialling tone and should now put down his handset. Relay RO6 in the relay set RO does not attract in this case because the contact 705 is actuated.

Calls to the instrument A1 are thereafter automatically connected to the machine T1. We now assume that a call is initiated from instrument A2 to instrument A1. The number 11 is thereby registered in the register REG by the relays E1, ER1 and E11, ER2 attracting. The relays RR8 and G3 attract. The following circuits are closed:

(*a*) +, contact 411, wire *g1*, contacts 181 and *e2*, multiple *u*, contacts 712, 665 and 651, winding on relay RO7, to negative. Relay RO7 attracts. Contact 671 is closed.

(*b*) +, contact 413, wire *g2*, the contacts 182 and *e12*, multiple *u*, the contacts 722, 668 and 653, the upper winding on relay RO8, contacts 671 and 600, to negative.

Relay RO8 in the switch, which has registered the subscriber's number 11, attracts. The contacts 681—685 are actuated. Relay RO8 is kept energized through its lower winding. Relay MR1 in FIGURE 5 is energized through contact 683. The contacts 411—414 are actuated. The following circuits are closed:

(*a*) +, contact 414, wire *s2*, the contacts 682, 661, 650 and 702, multiple *u*, winding on relay U10, to negative.

(*b*) +, contact 412, wire *s1*, the contacts 681, 663, 655 and 752, multiple *u*, winding on relay *u2*, to negative.

The relays U10 and U2 attract. The contacts 201—203 and 220 are closed.

In the meantime a free link SN has been selected as described above and relay MR2 connects the testing relay MR3 in the following circuit:

+, contact 441, the upper and lower windings on relay MR3, contact 421, wire *v2*, the contacts 220 and 202, wire *p3*, winding on operating magnet B3 in FIGURE 2, to negative. If the machine T1 is free, the testing relay MR3 attracts. The contacts 431—433 are actuated. The operating magnet B3 attracts in the testing circuit after the upper winding on relay MR3 has been short-circuited. The contacts *a3*, *b3*, *c3* are actuated.

At the same time the calling instrument A2 has been identified as described above through operation of relay D1 in FIGURE 2 and the relays T2 and T11 have attracted so that the contacts 320 and 312 are closed. The operating magnet B2 attracts. The contacts 31—36, *a2*—*b2* are actuated. Relay LR2 is kept energized in series with the relays N2 and N3 in the link and call signal is sent to the sound reproducing machine T1 according to what has been described in the preceding. In this case the call signal is immediately broken through the following circuit: +, the lower contact in the interruptor RP, wire *m4*, choke coil Z1, rectifier *re1*, contact *b3*, wire *b*, contact 73, the upper winding on relay N1, contact 88, the upper contact spring set in the interruptor RP, to negative directly or over the transformer RGT. Relay N1 attracts. The contacts 71—76 are actuated. Line relay LR1 and relay N2 release. The instrument A1 is connected with the machine T1 through the contacts *a2*, *b2*, *a3*, *b3*. The machine T1 is started by relays, which are energized over contact *c3*.

After the calling subscriber has listened to the message of the machine, he puts down his handset so that the circuit over line L2 and instrument A2 is broken. As soon as the interruptor RP thereafter operates its lower contact, the current through the choke coil Z1 and the lower winding of the current feeding relay N3 is broken. The relays N3 and N1 release and the connection is ended.

It is important that a transfer set-up is cancelled when being no longer required. However, it easily happens that a subscriber forgets that he has switched his telephone number for transfer service. This is particularly true for short transfers with the directive digit 09 which are connected from any telephone instrument. To this end, the arrangement is such that a call from a telephone instrument which is switched for transfer service, is not answered with the usual answering signal from the register of the exchange but with a special answering signal. In order to achieve this, each call is identified when it is connected to a register. The relay RR4 in the register REG, FIGURE 4, attracts in series with the relay F3 in FIGURE 3 and the relay GM in FIGURE 5. The contacts 141—143, 107—109 and 481—485 are simultaneously actuated. The contact 141 closes the circuit for the relay D1 in the identifier D and the contact 481 closes a circuit through the wire S5, the contacts 612 and 601 in all the relay sets set up for transfer service, through the winding on the relay RO5. The relay RO5 attracts at each call. The contacts 650—655 are actuated and the control relays RO7 and RO8 are connected to the multiple *t* over the contact on the relays K31—K30, K41—K40. If the call occurs from the number registered by the relays K31—K30, K41—K40, the relays RO7 and RO8 attract. The following circuit is completed: +, the contacts 683 and 621, wire S3, contact 483, wire *g*9, the upper winding on relay RR10, contact 143, to negative. The relay RR10 attracts. The contacts 121—123 are actuated. During the release time for the relay RR4, the relays RR1 and RR3 attract. The relay RR10 is kept energized through its lower winding through the contacts 121 and 133. The buzzer generator S*u*2 is disconnected by the contact 123 and the buzzer generator S*u*5 is connected by the contact 122. When the calling subscriber hears the signal from the buzzer generator S*u*5, he has to dial the directive digit 01 and release the relay set RO, as described above.

According to this invention relay sets RO are used for automatic telephone checking service. For this purpose special relay sets have been used which, however, are substantially equal to the relay sets described above, and for this reason only one kind of relay sets is arranged and provided with a switching relay RO11 which switches from transfer service to telephone checking service and vice versa. If a calling subscriber wishes to be called up by the called subscriber when the latter returns or becomes available, a special directive number 00 is called. In the register REG, FIGURE 4, the first naught is registered by operation of the relays E0 and ER1. The contacts *e*5—*e*7 and 191—193 are actuated. The relay RR7 attracts. The contacts 171—173 are actuated. The second naught is registered by operation of the relays E10 and ER2. The contacts *e*41—*e*43 and 195 are actuated. The following circuit is closed: +, the contacts *e*7 and *e*43, the upper winding on relay RR9 and the lower winding on relay RR5, to negative. The relays RR9 and RR5 attract. The contacts 196—197 and 151 are actuated. The registering 00 is disconnected by the holding current of the relays E0, ER1, E10 and ER2 being broken by the contact 151. The relays RR7 and RR9 are held in circuits through the contacts 135, 173 and 197. The subscriber then dials the called number.

Here is assumed that the subscriber at the instrument A1 calls the subscriber at the instrument A2, but does not receive any answer and therefore wishes to give a message to the subscriber at the instrument A2 telling him to call the number 11, i.e. the number of the instrument A1. After the directive digit 00, a dialling tone is agan connected from the register REG and the subscriber dials the number 11. The relays E1, ER1, E11 and ER2 attract. The register is connected to the marker, whereby the relays RR8, G3 and the identifying relay D1 attract. A free relay set RO is selected by means of a circuit through the wire *g*4. The relays R1, RO2 and RO4 attract. Owing to the identifying the relays K11 and K21 attract in the circuit through the wires *t*11 and *t*1 in the multiple *t*. Owing to the registering in the register REG the relays K31 and K42 attract in circuits from the contacts 411 and 413 of the marker M through the wires *g*1 and *g*2 and the multiple *u*. Furthermore the following circuit is closed: +, the contacts 196 and 187, wire *g*7, contacts 517, wire *k*5, winding on relay RO11, the contacts 631 and 622, winding on relay RO1, to negative. The relays RO11, RO1 and also RO5 attract. The contacts 600—608, 609, 611—614 and 651—654 are actuated. The circuit through the wire *g*5 is closed by the contact 613 and the relay RR5 in FIGURE 4 attracts. The contact 151 is actuated. The relays E1, ER1, E11, ER2, RR8, G3, R1, RO2 and RO4 release their armatures. The contact 191 is closed and the subscriber again hears a dialling tone from the register, which indicates that telephone checking service has been connected to the subscriber's line L2.

When the subscriber at the instrument A2 returns, he may lift his handset and listen if somebody wishes a communication. When his line L2 is connected to the register REG, the relay RR4 first attracts which relay closes the contact 141 and operates the relay D1 in the rectifier. The relay RO7 in the supervising relay set attracts and closes the contact 671. The following circuit is closed, if the sound reproducing machine PF which is common to the relay sets, is free: +, the contacts 38, 46 and 52 in FIGURE 2, wire *t*2 *in* multiple *t*, the contacts 753 and 654 in FIGURE 6, the upper winding on relay RO8, the contacts 671 and 609, rectifier *re*, wire *f*6, contact 911, to negative. The relays RO8 and RR10 attract. In the register FIGURE 4 the contacts 121—123 are actuated and the subscriber hears the answering signal from the buzzer generator S*u*5 which means that he has to call the directive digit 01 and dial his own number.

When the directive digit 01 is registered in the register, the relays RR5, RR6 and RR7 attract. The contact 151 is actuated and restores the register to normal so that a dialling tone is again obtained. Thereafter the subscriber dials his own number, in this case 12. When the relay RR8 attracts, the number of the calling subscriber's line L2 is again identified and the relays RO7 and RO8 in the supervising relay set attract. At the same time the following circuit is closed: +, the contacts 162 and 186 in FIGURE 4, wire *g*6, the upper winding on relay RO3, winding on relay RO10, contact 685, to negative. The winding on relay RO10 has a high resistance and therefore only RO10, and not RO3, attracts. The contacts 791—792 are actuated. The following circuit is closed: +, the contacts 792 and 608, wire *f*5, winding on relay V1 in FIGURE 7, to negative.

The relays V1, V2 . . . V7, V8 in FIGURE 7 form a relay chain V, in which each relay set RO has two relays. A plurality of relay sets can supervise the same subscriber's line but contain different registerings regarding the telephone number to be called up. When a supervised subscriber's line is identified a plurality of relay sets RO can simultaneously be operated, whereby corresponding relays V1, V3 . . . V7 in the relay chain V attract. It is assumed that the relays V1 and V3 attract. The contacts 811—816 and 831—836 are actuated. The relays V2 and V3 attract quickly but are slow releasing. The contacts 821—824 and 841—844 are actuated. The relay V1 is then held in a circuit over the contacts 982, 1011 and 813. The relay V3 is held in a circuit over the contacts 824 and 833.

In the relay set RO the relay RO8 is kept energized through its lower winding and the relay MR1 in the marker M is operated. Through the wires S1 and S2 and the contacts 681, 607, and 682, 603, respectively, the number 00 in the multiple *u* is indicated. The relays U0 and U10 in FIGURE 4 attract. The contact 791 in FIGURE 6 closes a circuit through the wire *g*7 through the winding on relay MR2, contact 442, wire *m*2, contacts 105—104, for selection of a free link N. One of the relays H11—H10 and corresponding selecting magnet, for example S9 and MR2, attract. The contact 421 is actuated and closes the following circuit: +, contact 441, the windings on the testing relay MR3, contact 421, wire *v*2, the contacts 230, 203, wire *p*4 in the bunch of wires *p*, winding on operating magnet B4, to negative. The relay MR3 attracts, the contacts 431—433 are actuated. At the identifying the relays T11 and T2 attracted in circuits through the multiple *t*, and therefore the contacts 312 and 320 are closed. The operating magnets B2 and B4 attract in circuits through the wires *p*12 and *p*4 and the wires *v*1 and *v*2. The contacts 41—46 and *a*2, *b*2, *c*2 and *a*4, *b*4, *c*4 are actuated, whereby the subscriber's line L2 is connected to the link SN together with the amplifier TF2, which through the wires *f*1 and *f*2 is connected to the machine PF in FIGURE 7. The call signal from the link SN is broken by a circuit through the choke coil Z2 and the rectifier *re*2. The sound reproducing machine comprises a disc with sound grooves. The disc is rotated by means of an alternating current motor. The disc has an initial position and is rotated one revolution for each message.

The machine PF is started through the following circuit: +, the contacts 816, 913, 921, winding on relay P13, to negative. The relay P13 attracts, the contacts 931—932 are actuated. The relay P12 attracts. The contacts 921—923 are actuated. The relay P13 is slow-releasing, whereby a certain delay is introduced before the relay P11 attracts and breaks the connection procedure. The relay P12 is kept energized through the contact 922. When the relay R13 releases its armature the relay P11 attracts in a circuit through the contacts 932 and 923. The contacts 911—915 are actuated, whereafter the relay P11 is kept energized over the contacts 816 and 914. The relay P12 releases its armature. The relay P22 attracts in a circuit through the contact 915. The contacts 1021—1023 are actuated, the motor PFM of the machine PF thereby being started. The machine leaves its initial position, the contact 1030 being closed. The relay P15 attracts in a circuit over the contacts 1030 and 943. The contacts 951—953 are actuated. The relay PV attracts. The contact 800 is closed.

The machine now gives a first message, for example "please call." Hereby the outermost sound groove on the disc is played off in the following circuit: contact 800, coil HPV, wires $f1$ and $f2$, amplifier TF2, two condensers, the contacts $a4$, $b4$, $a2$ and $b2$, line L2 and apparatus A2 and the contacts 43 and 33.

After the disc of the machine has turned one revolution the contact 1030 is broken for a short moment, the relay P14 attracting in the following circuit: +, the contacts 1001 and 912, winding on relay P14, contact 953, winding on relay P15, to negative. The contacts 941—943 are actuated. The relay PV releases its armature. When the contact 1030 again closes, the relay P17 attracts with current over the contacts 1030, 942 and 963. The contacts 971—974 are actuated. The following circuit is closed: +, contact 971, contact 961 in FIGURE 6, contact 714, the bundle of wires $f$, winding on relay P1, to negative. The contact 801 is closed. The digit "one" is announced through a circuit over the contact 81, the coil HP1 and the talking wires $f1$ and $f2$. After the disc of the machine has rotated a second revolution, the contact 1030 is again opened for a short moment. Hereby the relay P16 attracts in the following circuit: +, the contacts 1001, 952, winding on relay P16, contact 973, winding on relay P17, to negative. The contacts 961—963 are actuated. The relay P1 releases its armature. When the contact 1030 is again closed, the relay P19 attracts with current over the contacts 1030, 942, 962 and 983. The contacts 991—993 are actuated. Because the telephone number 11 is registered in the relay set RO, the relay P1 attracts again, but in the following circuit over the contact 981, 991, 692, 724. The contact 801 is again closed and the digit "1" is announced for the second time. Owing to that the subscriber at the instrument A2 has been informed that number 11 wishes a call. When the contact 1030 breaks, the relay P18 attracts in a circuit over the contacts 1001, 972 and 992. The contacts 981—984 are actuated. The relays P1 and V1 and consequently RO9 release their armatures. The relay P21 is energized through 984 and 1002 and attracts. The contact 1011 is closed. The relay P20 attracts. The contacts 1001—1004 are actuated. During the release time for the relay P21, which is slow-releasing, the relays P14—P19 release. Simultaneously the following circuit is closed during the release time for the relay V2: +, contacts 822, 811, wire $f3$, the contacts 631 and 611, winding on relay RO1, to negative. Hereby the holding windings are short-circuited on the relays K31, K42, K11, K21, RO11 and RO5 which release their armatures. When the relay V2 releases, the relay RO1 is also released and the relay set RO is restored to normal. The machine is kept running until the contact 1030 breaks the current of the relay P22, which is held by its right winding and the contact 1023.

It has here been assumed that one more relay set RO has registered the number 12 as telephone check, for which reason the relay V3 is held also after the relay V2 is released in a circuit over the contacts 982, 814, 823 and 833. Owing to that also the relay P11 is kept energized through the contacts 836 and 914. When the contact 1030 is again closed, the relay P15 attracts once more and the operation described above is repeated for the relay which corresponds to the relays V3—V4 and in which the relay RO9 attracts in the following circuit: +, the contacts 821, 842 and 832, the wire corresponding to $f4$, winding on RO9, to negative.

After all the relay sets, the relays V1, V3 or V7 of which have attracted at the call, have been restored to normal, the relay P11 releases, whereafter the machine PF is free and can deliver messages for other lines.

The invention is of course not limited to the embodiment described above. Thus, it is not necessary to dial the directive digit 01 and the subscriber's own number to be able to listen to the message of the telephone checking service. An additional directive number, for example 03, may be used. It is only for the purpose of reducing the number of directive numbers that the disconnection operation has been chosen.

It is also possible to eliminate the sound reproducing machine PF completely and to set up the waiting connetion automatically, immediately as a call from the intended telephone instrument is identified. This, however, has the drawback that, if answer is not obtained from the one who has wished the connection, the subscriber will not receive any message which person has been calling.

With answering devices it may, however, be assumed that the waiting subscriber always answers, and therefore a direct setting up of the connection can be used. A waiting device is described in U.S. Patent 2,819,345. By applying the invention to such a device a certain simplification of the device may be achieved. It is assumed that a subscriber A calls a subscriber B, who is engaged in a communication of long duration. The subscriber A wishes to record himself as waiting and calls the directive number of the waiting device and dials thereafter the number of the subscriber B. The number of the calling subscriber is identified and registered in a first registering device pertaining to the device and the number of the called subscriber is registered in a second registering device pertaining to the device. The subscriber A then puts down his handset. The waiting device connects itself to the marker, which indicates the link that keeps the subscriber B busy, whereafter the device through a special selector is connected to said link in accordance with the description and the drawings of Patent 2,819,345. By means of a special relay the waiting device probes when the subscriber will be free and then it sets up a communication between the two subscribers.

The connection of this communication occurs according to the invention in such a way that the waiting device connects itself to the marker and by the aid of the marker calls the one subscriber, suitably B, whereby a connection is set up between the waiting device and the subscriber B. A signal is sent to B (call signal, if he is free, voice signal, if he is busy) and the connection is disconnected, whereafter the waiting device, in accordance with the description above, as automatic watch supervises the subscriber B. When B lifts his handset calls from B are identified, which causes the waiting device to set up the communication between B and A with the aid of the marker.

According to an embodiment of the invention the calling subscriber is identified immediately at the call and the identified number is registered in the register on particular registering devices in accordance with a procedure known per se. Hereby the multiple $t$ in the FIGURES 4–6 is used and the relay sets RO control if the called number is registered for telephone watch. After the register REG has been connected to the marker M, the identified number is read through special marking wires which are connected to special registering devices in the register, in order to effect the connections and registration that occur in cooperation between the register and the marker. The multiple $u$ is maintained in accordance with the FIGURES 4–6. As a result the marker M does not need to be marked busy at the calling identification and the identifier does not need to co-operate in the setting up a connection made by the marker.

We claim:

1. In a private automatic telephone exchange, in combination, subscriber's lines (L1, L2), selectors (BL1–BL4), registers (REG), a call identifier (D) and a marker (M) for setting up communications through said selectors under control of said registers and said identifier, means (G, RR8) connecting said registers one at a time to the marker, a first group of conductors ($u$) for connecting the registers and the marker to mark the called telephone number which is registered in the register connecter to the marker at a call, and a second group of conductors ($t$) for marking the number of the calling line which is identified at the call, a plurality of relay sets (RO) for registering waiting calls, each of said relay sets comprising a first registering device (K31–K40) arranged to be set by signals through said first group of conductors and a second registering device (K11–K20) arranged to be set by signals through said second group of conductors, said first and second registering device each including contacts (733, 753 and 714, 724), an idle one of said relay sets being selected by the marker in response to an introductory call initiated by calling a special directive number whereupon said registering devices are set through said groups of conductors to register the number of a called but not available subscriber's line and the number of the identified subscriber's line which has called said special directive number, a control device (RO7, RO8) included in each of said relay sets and actuated by said call identifier in response to signals through said second group of conductors ($t$) and said contacts (733, 753) of the first registering device (K31–K40) when a call is identified from the subscriber's line registered in the first registering device in the respective relay set, signalling means, each of said control devices closing an operating circuit (through conductors S3 and contacts 483 or 432) including means (RR10 or MR1) connecting the identified calling line to the signalling means (S$u$5 in FIG. 4 or the machine PF in FIG. 7), said signalling means indicating to the calling subscriber the registration made in the respective relay set.

2. A private automatic branch telephone exchange according to claim 1, also comprising a sound reproducing machine (PF) including sending means (HPV, HP1–HP0) and reading means (P, PV, P1–P0), relay means (MR1) in the marker, and connecting relays (V1, V2, RO9) in each of said relay sets (RO, FIG. 6), each of said control devices (RO7, RO8), when operated, actuating the respective connecting relays to connect the contacts (714, 724) in said second registering device (K11–K20) of the respective relay set to said reading means of the sound reproducing machine and actuating said relay means (MR1) in the marker through said operating circuit, the marker thereafter connecting the identified calling line to said sending means of the sound reproducing machine, which reads and reproduces the number registered in the connected registering device (K11–K20).

3. A private automatic branch telephone exchange according to claim 1, also comprising means (contact 141 in FIG. 4) actuating the call identifier D to identify a calling subscriber's line immediately when the line the marker is connected by the marker to the register, a relay (RR10) having contacts in each register, the control device in a relay set, in which the number of the identified calling line is registered as called party, operating said relay (RR10) in the respective register through said operating circuit and the contacts of the relay changing a dialling tone sent from the respective register to the call.

4. A private automatic branch telephone exchange according to claim 1, also comprising means (contact 141 or 188 in FIG. 4) in each register for actuation of the identifier to identify a calling subscriber's line connected to the register, a relay (RR10) in the register operated through said operating circuit by the control device in a relay set in response to the number of the calling line being registered as called party in such relay set, said operated relay connecting said signalling means (S$u$5) to the calling subscriber's line to send a specific audible signal to said line.

5. A private automatic branch telephone exchange according to claim 1, and also comprising means in each register to register at least two different types of introductory calls, one being initiated by dialling a special directive number marking that the registration of a waiting call is desired and the other being initiated by dialling a special directive number marking that a registration for an automatic transfer service is desired, and auxiliary relays (RO11, RO5) in each of said relay sets operated according to the desired one of said registrations.

References Cited in the file of this patent

UNITED STATES PATENTS

| | | |
|---|---|---|
| 1,041,536 | Warwick | Oct. 15, 1912 |
| 1,673,420 | Ostline | June 12, 1928 |
| 1,915,413 | Elkins | June 27, 1933 |
| 2,850,570 | Muller | Sept. 2, 1958 |
| 2,889,403 | Tyskiewicz | June 2, 1959 |